United States Patent
Bljumberg et al.

[15] 3,674,813
[45] July 4, 1972

[54] METHOD OF PRODUCING PROPYLENE OXIDE, PROPYLENEGLYCOL AND ITS ESTERS

[72] Inventors: Erna Albertovna Bljumberg, Leninsky prospekt, 57, kv. 10; Alexandr Vasilievich Bobolev, Leninsky prospekt, 30, kv. 104; Svetlana Pavlovna Boboleva, Leninsky prospekt, 30, kv. 104; Nikolai Markovich Emanuel, Vorobievskoe shosse, 26, kv. 44, all of Moscow, U.S.S.R.

[22] Filed: June 19, 1967

[21] Appl. No.: 647,250

[30] Foreign Application Priority Data

June 20, 1966 U.S.S.R..................................1085374
June 20, 1966 U.S.S.R..................................1096534

[52] U.S. Cl............................260/348.5, 260/488, 260/533, 260/597, 260/601, 260/632, 260/635
[51] Int. Cl...................C07d 1/12, C07d 1/08, C07d 31/20, C07d 27/12

[58] Field of Search..................................260/348.5 LV, 635

[56] References Cited

UNITED STATES PATENTS

| | | | |
|---|---|---|---|
| 2,784,202 | 3/1957 | Gardner et al. | 260/348.5 |
| 3,222,382 | 12/1965 | Lanthier | 260/348.5 |
| 3,238,229 | 3/1966 | Reid | 260/348.5 |
| 2,530,509 | 11/1950 | Cook | 260/348.5 |

FOREIGN PATENTS OR APPLICATIONS 872,560  7/1961  Great Britain......................260/348.5

Primary Examiner—Norma S. Milestone
Attorney—Waters, Roditi, Schwartz & Nissen

[57] ABSTRACT

Propylene oxide, propylene glycol and esters thereof are produced by oxidizing propylene with an oxygen containing gas in an inert solvent at a temperature of at least 120°C. and a pressure of 50 to 10 atm in the presence of fluorine containing catalysts.

8 Claims, No Drawings

METHOD OF PRODUCING PROPYLENE OXIDE, PROPYLENEGLYCOL AND ITS ESTERS

This invention relates to methods of producing propylene oxide, propyleneglycol and esters. Propylene oxide is a preferred starting material for production of polymers, propyleneglycol, de-emulsifiers, for glycerin synthesis, and for other uses in the chemical industry.

Until now, the chlorohydrin method has been practically the only one used in industry for propylene oxide production. According to this method, 3 tons of chlorine and alkali subsequently converted to non-utilizable waste polluting the environmental nature are consumed per 1 ton of the product obtained.

There are also known methods for the chlorine free production of propylene oxide by liquid-phase oxidation of propylene. These methods involve propylene oxidation in inert solvents at temperatures of 150° to 200° C and pressures of 50 to 250 atm, epoxidation of propylene with various reagents such as peracetic acid solutions, ethylbenzene hydroperoxide in the presence of catalysts, and oxidation of propylene in conjunction with other organic compounds (aldehydes, ketones, hydrocarbons) which undergo oxidation more readily than the said olefin.

Until now, propylene oxidation in inert solvents (mainly in benzene) has not been realized in industry due to the low concentration of propylene oxide in the reacting mixture (amounting to not more than 2.0 weight percent), low selectivity of propylene oxide and propyleneglycol formation, great amount of side products, and considerable conversion of propylene to carbon dioxide. Moreover, this process may be conducted only to a small extent of propylene conversion, not exceeding 10 molar percent, for at higher conversion, $CO_2$ becomes the main product of propylene oxidation.

Improvements of the process by use of various catalysts, by rapid removal of acids from the reaction mixture in order to prevent their reactions with propylene oxide, etc. (U.S. Pats. Nos. 2,784,202, 1957; 3,071,601, 1963; 3,153,058, 1964; British Pat. No. 917,926, 1959) failed to secure an efficient technological process.

One of the reasons for the low yields of useful products in propylene oxidation is the undesirable effect of the reactor material (stainless steel) on the mechanism of the process. As stated in a paper by E.A. Bljumberg, Ju.D. Norikov and N.M.Emanuel published in Dokl. Akad. Nauk SSSR vol. 151, No.5 page 1,129, 1963, stainless steel used in liquid-phase butane oxidation leads to isomerization and decomposition of peroxy radicals, yielding products which contain less than four carbon atoms.

The object of the present invention is to eliminate the above disadvantages of the known process of propylene oxidation in a benzene solution and to obtain an effective method for the industrial production of propylene oxide and of propyleneglycol, based on the cited reaction.

On the basis of the above theoretical concepts concerning the undesirable catalyzing effect of stainless steel, applicants propose that the process of propylene oxidation in inert solvents, be conducted in non-metallic reactors, particularly those which do not induce isomerization and decomposition of peroxy radicals.

The effect of stainless steel upon the liquid-phase oxidation of hydrocarbons shows that heterogeneous catalysis takes place in these reactions, thus causing a search for positive heterogeneous catalysts making for an increase in the reaction selectivity.

In the present invention fluorine-containing compounds, for example, fluorine-containing polymers such as Teflon (polytetrafluoroethylene) and fluorine-containing salts, are used as catalysts.

The invention is a method of producing propylene oxide, propyleneglycol and its esters comprising oxiding propylene in an inert solvent with an oxygen-containing gas at a temperature of at least 120° C, a pressure of 50 to 100 atm in a non-metallic reactor and in the presence of a fluorine-containing catalyst.

Glass or porcelain, enamel may be used as the non-metallic materials. Teflon (polytetrafluoroethylene), salts of alkaline earth and alkali metals such as $K_2SiF_6$, $NaF$, $K_2TaF_7$ etc., may serve as the fluorine-containing catalysts.

Benzene, acetone and other compounds which do not oxidize or oxidize only weakly under the conditions described above may be used as inert solvents.

The efficiency of the process according to the present invention is set forth in detail in the following non-limiting examples.

EXAMPLE 1

A Teflon reactor in a steel casing is charged with 50 ml of benzene, the reactor is hermetized, air from a tank is fed through a Teflon tube to a pressure of 50 atm. The reactor is heated to 145° C and 30 ml of liquid propylene are introduced under air pressure. Air is then bubbled through the mixture. Steady-state concentration of propylene dissolved in benzene is ensured by continuous premixing of propylene to the stream of air fed to the reactor.

Samples are withdrawn in the course of propylene oxidation. These are analyzed by means of chemical techniques and of gas-liquid chromatography using a flame ionization detector. Propyleneglycol distearate (15 weight percent of the celite used) represent the immobile phase. The acids are analyzed by means of a chromatograph with a katharometer. In this case, the immobile liquid phase is a mixture of 5 percent of silicon oil, 5 percent of paraffin, 20 percent of dioctylsebacinate and 10 percent of stearic acid.

The distribution of reaction products and their yields per reacted propylene are shown in Table 1. The same Table lists the results of experiments made under the abovementioned conditions but using reactors of stainless steel (with no wall coating) and of glass.

The distribution of products for all reactors refers to the time corresponding to maximum propylene oxide concentration in the reacting mixture.

TABLE 1

| Reaction product | Stainless steel | | Glass | | Teflon | |
| --- | --- | --- | --- | --- | --- | --- |
| | In weight percent | In molar percent of reacted propylene | In weight percent | In molar percent of reacted propylene | In weight percent | In molar percent of reacted propylene |
| Propylene oxide | 1.1 | 52.0 | 4.8 | 46.5 | 7.5 | 33.0 |
| propyleneglycol and its esters | — | — | 1.3 | 10.5 | 13.6 | 47.2 |
| acetic acid | 0.7 | 2.0 | 2.9 | 15.9 | 3.4 | 8.5 |
| formic acid | 0.6 | 1.5 | 2.2 | 7.4 | 2.0 | 3.9 |
| acetaldehyde | 0.4 | 5.6 | 0.22 | 1.0 | 0.4 | 1.2 |
| acetone | 0.7 | 14.5 | 0.30 | 3.0 | 0.3 | 1.6 |
| isopropyl alcohol | — | — | 0.10 | 1.0 | 0.2 | 1.1 |
| Methylacetate | — | — | — | — | 0.2 | 0.5 |
| allyl alcohol | — | — | 0.30 | 3.2 | — | — |
| acrolein | — | — | 0.08 | 0.5 | — | — |
| acrylic acid | — | — | 0.2 | 1.2 | — | — |
| methanol | — | — | 0.15 | 1.0 | 0.1 | 0.3 |
| methylformiate | — | — | 1.4 | 8.2 | 0.6 | 2.0 |
| carbon dioxide | — | 24.4 | — | 0.6 | — | 0.7 |
| Total: | 100.0 | | 100.0 | | 100.0 | |
| Extent of propylene conversion, in molar percent | 10.0 | | 22.9 | | 49.0 | |

EXAMPLE 2

The experiment is carried out as in Example 1, in a glass reactor operating under bilateral pressure of 50 atm. The glass reactor is made as a long tube cased in a steel autoclave. The lower (broader) part of the reactor is heated by an electric furnace and serves as the reaction zone. The upper part acts as a reflux condenser, thus preventing contact between the reacting mixture and metal. The distribution of propylene oxidation products is shown in Table 1.

EXAMPLE 3

The experiment is carried out as in Example 1, in a Teflon reactor filled with Teflon chips. The reactor is charged with 50 ml of benzene. In 8 hours after the start of oxidation the overall content of the reactor amounts to 140 ml. A marked separation of the reacting mixture to two layers, that of the benzene solution (115 ml) and that of the aqueous solution (25 ml) is observed. The composition of both layers and the product yields per reacted propylene are shown in Table 2.

Table 2

| Reaction product | Concentration | | | | Yield per reacted Propylene, molar percent |
|---|---|---|---|---|---|
| | Upper layer | | Lower layer | | |
| | weight percent | molar percent | wt. percent | molar percent | |
| Propylene oxide | 7.5 | 1.14 | 6.4 | 1.1 | 28.6 |
| Propyleneglycol and its esters | 13.6 | 0.81 | 38.5 | 2.6 | 56.2 |
| Acetic acid | 3.1 | 0.45 | 6.6 | 1.1 | 8.9 |
| Formic acid | 2.0 | 0.37 | 4.2 | 0.9 | 3.3 |
| Acetone | 0.3 | 0.04 | 0.1 | 0.03 | 0.9 |
| Isopropyl alcohol | 0.3 | 0.04 | 0.2 | 0.08 | 0.9 |
| Acetaldehyde | 0.4 | 0.08 | 0.3 | 0.08 | 1.2 |

EXAMPLE 4

The experiment is carried out as in Example 1, but in a stainless steel reactor containing Teflon chips as heterogeneous catalyst.

The maximum concentration of propylene oxide (1.0 mole/l) is attained in 3 hours after the start of the reaction. The distribution of products and their yields per reacted propylene obtained to this time are shown in Table 3. The extent of propylene conversion during 3 hours of the reaction is 32 percent.

TABLE 3

| Reaction | Concentration | | Yield per reacted propylene, molar percent |
|---|---|---|---|
| | Molar percent | Weight percent | |
| Propylene oxide | 1.00 | 6.6 | 50.0 |
| Propyleneglycol and its esters | 0.20 | 3.3 | 20.0 |
| Acetic acid | 0.28 | 1.9 | 9.5 |
| Formic acid | 0.23 | 1.2 | 4.0 |
| Acetone | 0.04 | 0.26 | 2.0 |
| Isopropyl alcohol | 0.04 | 0.27 | 2.0 |
| Acetaldehyde | 0.08 | 0.40 | 2.5 |
| $CO_2$ | 0.05 | — | 10.00 |
| Total: | | | 100.00 |

EXAMPLE 5

A reactor of molybdenum glass is charged with 50 ml of benzene and 1 g of $K_2SiF_6$. The reactor is hermetized and air is admitted to a pressure of 50 atm. The reactor is heated to 145° C and 50 ml of liquid propylene are introduced under air pressure. Air is then bubbled through the mixture. Steady-state concentration of the propylene dissolved in benzene is ensured by continuous premixing of propylene to the stream of air fed to the reactor. In 3 hours, a propylene oxide concentration in the reacting mixture of 1.8 g weight percent is attained.

EXAMPLE 6

The experiment is carried out as in Example 5, with the exception that acetone is used as solvent. The reactor is charged with 50 ml of acetone, 1 g of $K_2SiF_6$ and 50 ml of propylene. The results obtained are shown in Table 4. The composition of products and their yields per reacted propylene, as shown in this table, refer to the time corresponding to maximum propylene oxide concentration.

EXAMPLE 7

The experiment is carried out as in Example 6, with the exception that 1 g of NaF is used as the fluorine-containing catalyst. The results obtained are shown in Table 4.

TABLE 4

Distribution of products and their yields in the liquid-phase oxidation of propylene in an acetone solution in the presence of fluorine-containing salts (referred to the time corresponding to maximum propylene oxide concentration). A glass reactor; temperature of 145° C, pressure of 50 atm.

| Reaction product | $K_2SiF_6$ | | NaF | | $K_2TaF_7$ | |
|---|---|---|---|---|---|---|
| | Wt. % | Molar percent of reacted propylene | Wt. % | molar % of reacted propylene | Wt. % | Molar percent of reacted propylene |
| Propylene oxide | 9.4 | 44.0 | 6.0 | 33.0 | 4.9 | 29.0 |
| Propyleneglycol | 4.9 | 17.5 | 3.7 | 16.0 | 1.7 | 7.8 |
| Propyleneglycol esters | 3.7 | 6.8 | 4.7 | 10.2 | 2.1 | 4.7 |
| Propylene oxide + propyleneglycol + esters | 18.0 | 69.0 | 14.4 | 60.0 | 8.7 | 41.5 |
| Acetic acid | 3.4 | 10.3 | 2.0 | 9.5 | 2.9 | 9.0 |
| Formic acid | 1.7 | 3.6 | 6.1 | 13.0 | 4.4 | 17.0 |
| Methylformiate | 0.6 | 2.07 | 0.06 | 2.8 | 5.5 | 21.0 |
| Isopropyl alcohol | 0.7 | 3.06 | 0.05 | 2.3 | 1.1 | 6.4 |
| Allyl alcohol | 0.5 | 2.06 | 0.5 | 3.2 | 0.3 | 1.7 |
| Carbon dioxide | — | 11.0 | — | 12.0 | — | 11.0 |
| Time corresponding to maximum concentration of propylene oxide | 6.0 hrs | | 3.0 hrs | | 4.0 hrs | |
| Extent of propylene conversion (molar percent of the original propylene) | 67.0 | | 57.0 | | 56.0 | |

EXAMPLE 8

The experiment is carried out as in Example 6 and 7, 1 g of $K_2TaF_7$ being used as catalyst. The results obtained are shown in Table 4.

EXAMPLE 9

The experiment carried out as in Examples 1 and 4, using a reactor of stainless steel charged with 1 g of sodium fluoride as heterogeneous catalyst. The mixture is agitated with a stirrer. The distribution of products and their yields per reacted propylene, referred to the time corresponding to maximum concentration of propylene oxide in the reacting mixture, are shown in Table 5.

Time of reaction is 3.5 hours. Extent of conversion is 62.5 molar percent of the original propylene.

TABLE 5

| Reaction product | Concentration in acetone, weight percent | reacted propylene, molar per cent |
|---|---|---|
| Propylene oxide | 5.5 | 19.7 |
| Propyleneglycol | 3.3 | 9.3 |
| Propyleneglycol esters | 3.1 | 4.5 |
| Propylene oxide + propyleneglycol + esters | 11.9 | 33.5 |
| Acetic acid | 3.2 | 7.1 |
| Formic acid | 4.9 | 7.2 |
| Methylformiate | 1.1 | 3.5 |
| Isopropyl alcohol | 3.1 | 13.2 |
| Allyl alcohol | 2.5 | 10.0 |
| Carbon dioxide | — | 14.0 |

We claim:

1. A method of producing propylene oxide, propyleneglycol and its esters, which comprises oxidizing propylene with an oxygen-containing gas in an inert solvent selected from the group consisting of benzene and acetone, at a temperature of at least 120° C and a pressure of 50 to 100 atm in the presence of fluorine-containing catalyst selected from the group consisting of polytetrafluoroethylene, and fluorine salts of alkali and alkaline earth metals.

2. A method according to claim 1, wherein the catalyst is $K_2SiF_6$.

3. A method according to claim 1, wherein the catalyst is NaF.

4. A method according to claim 1, wherein the catalyst is $K_2TaF_7$.

5. A process for producing propylene oxide by direct oxidation which comprises dissolving propylene in an inert solvent selected from the group consisting of benzene and acetone and effecting oxidation at a temperature of at least 120° C by feeding into the solution an oxygen-containing gas maintained at a pressure of from 50 atm to 100 atm, wherein the reaction mixture consisting of propylene and oxygen dissolved in said solvent is contacted with a fluorine-containing salt of a metal selected from the group consisting of alkali and alkaline earth metals.

6. A process according to claim 5, wherein the fluorine-containing salt is $K_2SiF_6$, NaF or $K_2TaF_7$.

7. A method according to claim 1 wherein the temperature is 120° to 145° C.

8. A process according to claim 5 wherein the temperature is 120° to 145° C.

* * * * *